April 12, 1955

F. G. STEELE 2,706,270

DIGITAL CONTROL SYSTEM

Filed Sept. 23, 1950

INVENTOR.
FLOYD G. STEELE
BY Floyd G. Steele

April 12, 1955
F. G. STEELE
2,706,270
DIGITAL CONTROL SYSTEM
Filed Sept. 23, 1950
3 Sheets-Sheet 2
*Fig.3*
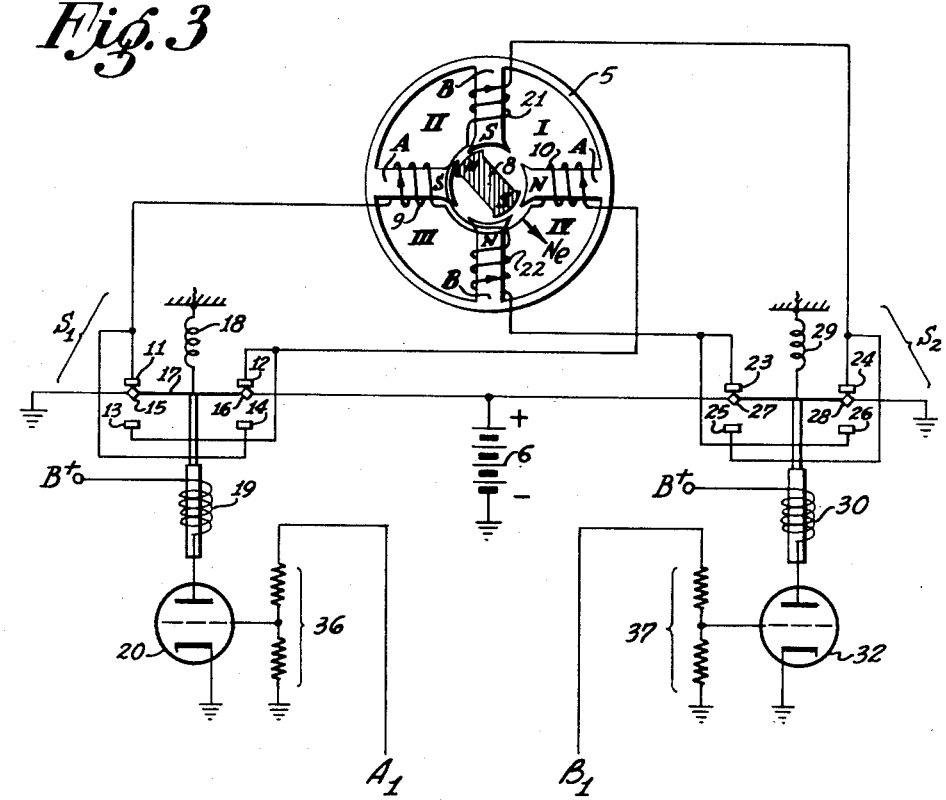
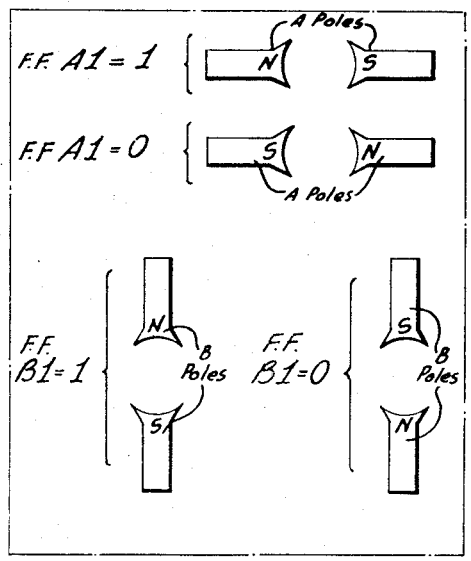
*Fig.5*
INVENTOR.
FLOYD G. STEELE
BY Floyd G. Steele April 12, 1955   F. G. STEELE   2,706,270
DIGITAL CONTROL SYSTEM
Filed Sept. 23, 1950   3 Sheets-Sheet 3
Fig. 6
| | INPUTS TO LOGICAL NET | | | CHANGE REQUIRED 36 | | OUTPUTS FROM LOGICAL NET | |
|---|---|---|---|---|---|---|---|
| | C | *P | A1 | B1 | A1 | B1 | a | b |
| 1ST ROW | 1 | 0 | 0 | 0 | 1 | 0 | 1 | 0 |
| | 1 | 0 | 0 | 1 | 0 | 0 | 0 | 1 |
| | 1 | 0 | 1 | 0 | 1 | 1 | 0 | 1 |
| | 1 | 0 | 1 | 1 | 0 | 1 | 1 | 0 |
| 5TH ROW | 1 | 1 | 0 | 0 | 0 | 1 | 0 | 1 |
| | 1 | 1 | 0 | 1 | 1 | 1 | 1 | 0 |
| | 1 | 1 | 1 | 0 | 0 | 0 | 1 | 0 |
| | 1 | 1 | 1 | 1 | 1 | 0 | 0 | 1 |
* 0 = CLOCKWISE; 1 = COUNTER-CLOCKWISE
$a = [P'(A_1'B_1' + A_1B_1) + P(A_1'B_1 + A_1B_1')]C$
$b = [P'(A_1'B_1 + A_1B_1') + P(A_1'B_1' + A_1B_1)]C$
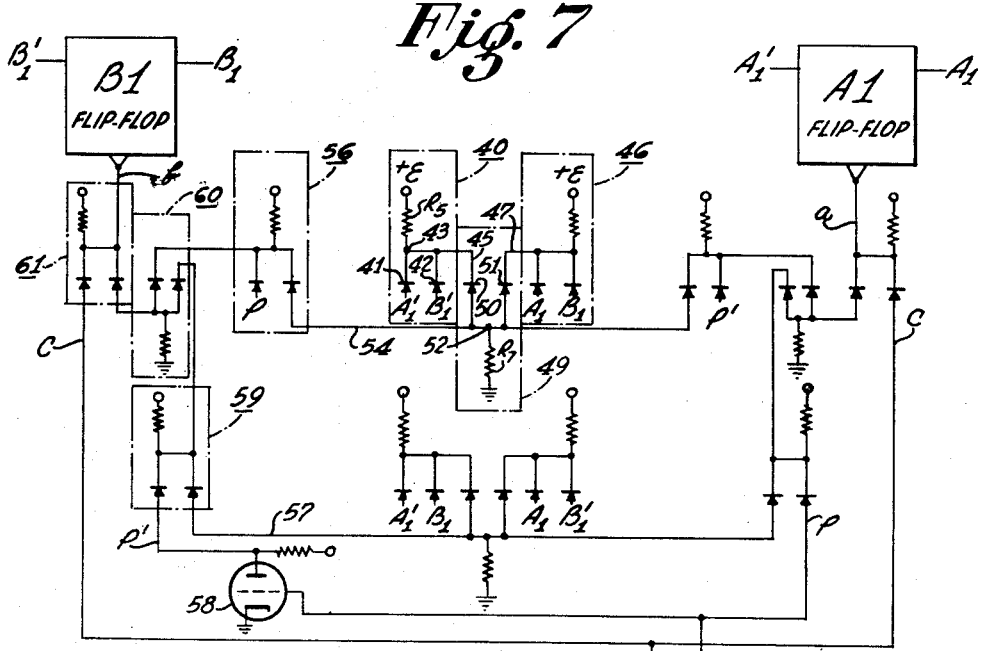
Fig. 7
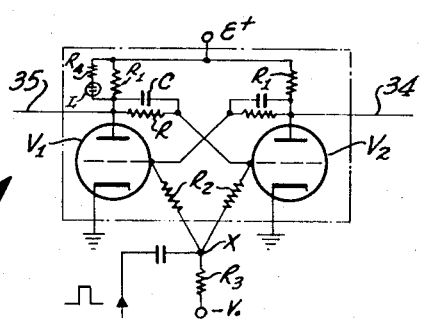
Fig. 4
INVENTOR.
FLOYD G. STEELE
BY Floyd G. Steele United States Patent Office 2,706,270
Patented Apr. 12, 1955

2,706,270

DIGITAL CONTROL SYSTEM

Floyd G. Steele, Manhattan Beach, Calif., assignor, by mesne assignments, to The National Cash Register Company, a corporation of Maryland Application September 23, 1950, Serial No. 186,358

11 Claims. (Cl. 318—283)

The present invention relates to control systems and more particularly to a means and method of controlling the rotation of a shaft in accordance with a stream of electronic pulses.

In digital control systems, electronic computers of the type having outputs expressed in unitary numbering systems are employed. In such a numbering system, information concerning fixed incremental changes of a function are represented by electronic pulses. One such system, defined herein as the "1–0" system, generates an output on two channels. One of these channels carries a train of clock pulses which define the time at which a change in the function can occur. The other channel carries electronic information, in the nature of a pulse or no pulse, concerning the change in the function. In accordance with the present invention, a coincidence of a pulse on the second channel with a clock pulse on the first channel indicates, for example, a positive incremental change of the function; while the lack of a pulse on the second channel with a clock pulse indicates a negative incremental change of the function. Thus the sum of the positive and negative increments of the function at any time from an arbitrary reference point represents the magnitude of the function.

One of the features of the present invention is to provide a means and method of converting this pulse information into a shaft rotation. At the occurrence of each clock pulse, the shaft is rotated a fixed incremental amount; and, depending on whether the information on the second channel is a pulse or no pulse, the incremental rotation is counter-clockwise or clockwise.

Another feature of the present invention is to provide a novel switch control circuit which controls the setting of switches in accordance with their previous setting plus information supplied in the form of electronic pulses.

Still another feature of this invention is to provide a novel switching means for controlling the direction of the incremental rotation of a motor by reversing the polarity applied across its poles.

Briefly, the present invention comprises a pair of input channels carrying pulses from a digital computer, for example, which is generating a function defining the rotation of a shaft. The shaft is rotated by a four-pole D. C. motor adapted to operate, effectively, as a two-pole motor. Opposite poles of the motor have their coils connected in series. One of the series coil circuits is connected through a first reversing switch to a D. C. power supply; while the other series coil circuit is connected through a second reversing switch to the D. C. power supply. A switch control circuit is provided which utilizes the information on the two channels from the computer for controlling the setting of the reversing switches in such a manner that the polarity of the poles of the motors can be reversed so as to rotate the armature of the motor a quarter turn, on the occurrence of each clock pulse, in the direction dictated by the information.

This invention will be better understood by reference to the following description considered in connection with the accompanying drawings.

Referring to the drawings:

Figure 3 is a wiring diagram of the D. C. motor and the control switches connecting its field poles to the power supply.

Figure 4 is a wiring diagram of a single-input flip-flop circuit employed as a switch proposition.

Figure 5 is a chart showing the logical propositions defining the energizing of the motor poles.

Figure 6 is a truth table for the switch control matrix together with the logical equations defining the conditions for triggering the switch flip-flops.

Figure 7 is a logical diode circuit for solving the logical equations shown in Figure 6.

Figure 1:
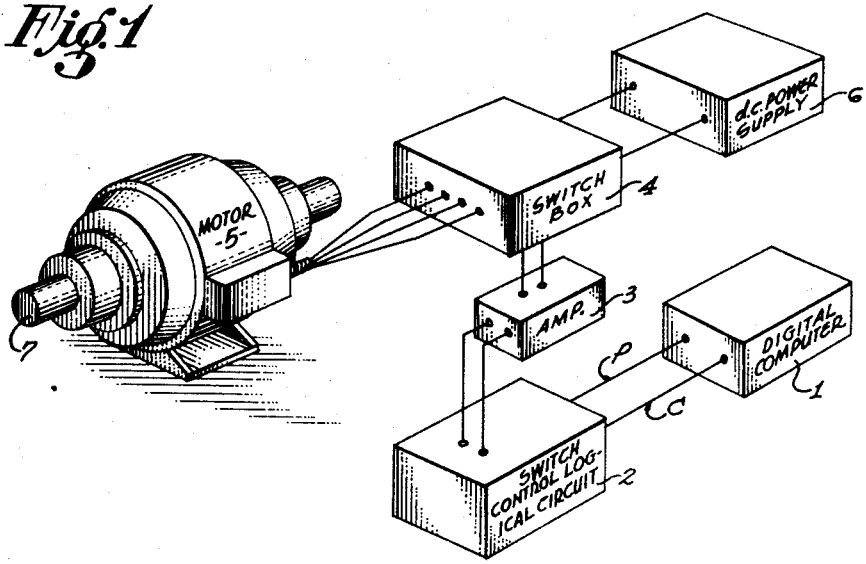
Figure 1 is an overall block diagram of the digital control system.

Referring first to the system layout of the present invention shown in Figure 1, a digital computer 1 generates electronic pulse information on channel P along with synchronizing clock pulses on channel C. These two pulse channels are fed into a logical switch control circuit 2. The operation of logical circuit 2 is dependent on the pulse input on the channels P and C and the previous states of the switches in a switch box 4. At the occurrence of each clock pulse, a change in potential is made on the output lines from logical circuit 2. After being amplified in amplifier 3, this potential adjusts the switch positions in switch box 4. This adjustment of the switches reverses, in the proper manner, the energization of the poles of motor 5 by D. C. power supply 6 to effect either a clockwise or counter-clockwise incremental rotation of shaft 7.

Figure 2:
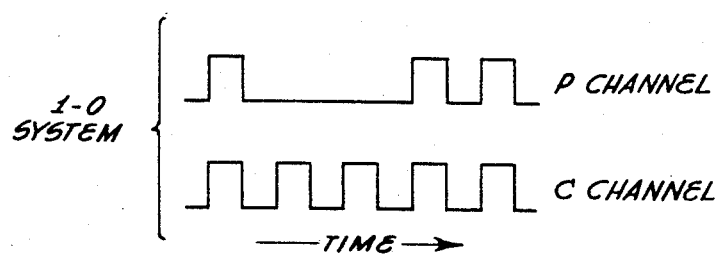
Figure 2 is a graph of the pulse information fed out of the digital computer.

In Figure 2, a graph shows the nature of the "1–0" system pulse information fed out of the digital computer 1 on channels P and C. A clock pulse appears at preferably fixed time intervals on channel C. A pulse on channel P, if any, occurs in coincidence with a clock pulse. A coincidence of pulses on the channels represents an incremental counterclockwise rotation of the shaft 7, while absence of a pulse on the P channel when a clock pulse occurs represents an incremental clockwise rotation of the shaft 7.

Figure 3 shows a detailed schematic wiring diagram of the motor 5 and the switches in switch box 4. Motor 5 is comprised of a permanent magnet armature 8 and four equally spaced field poles. The horizontal set of poles is designated as the A poles, and the vertical set of poles is designated as the B poles. Coils 9 and 10 wound around the left and right horizontal A poles, respectively, are connected in series; and coils 21 and 22 wound around the upper and lower vertical B poles, respectively, are connected in series. Opposite poles of the motor are so wound that when the series circuits so obtained are energized, one pole-face becomes the south pole and the other the north pole. Fundamentally, the motor is a two-pole one, since adjacent poles of the same polarity may be considered to be a single pole split in two.

In the present circuit each incremental rotation corresponds to a 90° rotation of armature 8. For ease of reference, the stable positions of motor armature 8 are marked as quadrants I, II, III, IV.

The terminals of the A pole coils are connected to upper left and right stationary contacts 11 and 12 on a left switch $S_1$. Lower left and right stationary contacts 13 and 14 of this switch are connected to opposite ends of the A pole coil terminals. Left and right movable switch contacts 15 and 16 are provided on a switch member 17. Switch member 17 is urged by retaining spring 18 so as to normally hold left and right movable contacts 15 and 16 against upper stationary left and right contacts 11 and 12, respectively. An electromagnet 19, disposed below movable switch member 17, is adapted to cooperate therewith such that it pulls left and right movable contacts 15 and 16 into engagement with lower left and right stationary contacts 13 and 14, respectively, whenever electromagnet 19 is energized. The left and right movable contacts 15 and 16 are connected to the negative (ground) and positive ends, respectively, of the D. C. potential source 6. Thus switch $S_1$ is a reversing switch since when it is in its upper position it energizes the A poles so that the right A pole is north and the left A pole is south; and, when it is in its lower position it energizes the A poles so that right A pole is south and left A pole is north.

The energization of electromagnet 19 is effected by an amplifier tube 20 to whose plate it is connected. Any time tube 20 conducts, switch member 17 of left switch S₁ is pulled downwardly to change the setting of the switch contacts.

In a similar manner, the terminals of the coils 21 and 22 of the B set of poles of the motor 5 are connected to an upper set of stationary contacts 23 and 24 of a right switch S₂. Lower stationary contacts 25 and 26 of this latter switch connect to opposite ends of the B pole coil terminals. Movable contacts 27 and 28 are normally held in engagement with upper stationary contacts 23 and 24, respectively, by means of retaining spring 29; however, any time second electromagnet 30 is energized due to conduction of second amplifying tube 32, movable contacts 27 and 28 are pulled down to engage the respective lower stationary contacts 25 and 26 of right switch S₂.

It is now evident that, depending on the position of the reversing switches S₁ or S₂, the A and B sets of poles of the motor 5 can have either one polarity or the other.

Since opposite poles are always of different polarity, the adjacent poles of the same polarity may be considered to be a single pole split into two. In Figure 3, the right horizontal pole A and the lower vertical pole B are considered to be north for the connections there shown. Hence their fields combine to produce an effective magnetic north pole $N_e$ positioned in quadrant IV of the motor. The armature 8 is then aligned so that its south pole is attracted by this effective north pole $N_e$.

Referring next to Figure 4, a schematic wiring diagram is shown of a typical, well known, flip-flop circuit used for representing the switch propositions of the present invention. The flip-flop circuit comprises two triodes $V_1$ and $V_2$ having each of their plates and grids intercoupled by a resistor R in parallel with a capacitor C. The plates of each of the triodes are connected through separate load resistors, like resistor $R_1$, to a positive D. C. source E. The grids of the tubes are joined at point X through separate grid resistors $R_2$, and returned to a negative bias V through a common resistor $R_3$. The flip-flop circuit is such that each positive input pulse applied on point X triggers the circuit so that opposite triodes will conduct. Right and left output leads 34 and 35 are taken from the plates of the triodes $V_2$ and $V_1$, respectively. The right output lead 34 when high in potential denotes that one state of the proposition represented by the flip-flops is true; and the left output lead 35 when high in potential denotes the other state of the proposition is true.

Whenever a flip-flop is considered to be in a "one" state, neon light L, connected in series with a limiting resistor $R_4$ across the left load resistor $R_1$, lights up; and when the flip-flop is in a "zero" state, neon light L is out. Thus the "one" state occurs when tube $V_1$ is conducting and a low potential appears on output lead 35. At the same time, a high potential appears on output lead 34.

In Figure 6, a table is shown of the propositions represented in the logical switch circuit. As noted, these propositions are all of a binary nature, i. e., they have two states as evidenced by a 1 or a 0 in the truth table.

The logical circuits are set up so that the existing state of a proposition at any time, i. e., the true state, is physically sensed as a high voltage level; while the non-existing state, i. e., the false state, is sensed as a low voltage level. In the present set-up the C channel proposition carries the clock pulse C which defines the time when a change in the system can occur, hence it only has meaning for this single state as denoted by 1 in the table. On the other hand, both states of the P channel proposition have meaning: the 1 state, denoted by the pulse P thereon, represents a counter-clockwise rotation of the shaft 7; while the 0 state, denoted by the inverse of the P channel potential, P', represents a clockwise rotation of shaft 7.

As for the propositions A1 and B1 which are derived from flip-flops, the 0 and 1 states of these propositions correspond to the digit content of the flip-flop circuit. These states (or outputs) are denoted by the letters given to the flip-flops along with an appropriate subscript. Moreover, the left output is distinguished from the right output by a prime. For example, in flip-flop A1, the right output, which is high in potential when the flip-flop contains a "one," is designated $A_1$, while its left output which is high when the flip-flop contains a "zero" is designated $A'_1$.

As shown in Figure 3, the right outputs $A_1$ and $B_1$ of flip-flops A1 and B1, respectively, are connected through voltage dividers 36 and 37 to the grids of first and second amplifying tubes 20 and 32, respectively. Hence, as shown in Figure 5, referring first to the horizontal poles A, when switch S₁ is set so that the left A pole is north and the right A pole is south, flip-flop A1 is considered to contain the digit "one." On the other hand, when switch S₁ is set so that the left A pole is south and the right A pole is north, flip-flop A1 is considered to be holding the digit "zero."

In a similar manner, when the upper B pole is north and the lower B pole is south, flip-flop B1 contains the digit "one," and when the upper B pole is south and the lower B pole is north, flip-flop B1 is considered to be in the "zero" state.

Hence the conduction of amplifying tubes 20 and 32, and consequently the setting of switches of S₁ and S₂, is determined by the digit content of flip-flops A1 and B1, respectively.

The truth table in Figure 6 is set up for determining the relationship between the states of the input propositions C, P, A1 and B1 for generating switch trigger propositions $a$ and $b$.

The first column C is the clock proposition which, as indicated, is always represented by a 1. Since proposition inputs P, A1 and B1 can exist in either of two states, a binary table through decimal 8 is written, in their respective columns, representing all the combinations possible with them. In order to complete the table, the states of flip-flops A1 and B1 are inspected, along with the state of input P. If P is 0, flip-flops A1 and B1 must be so changed that the effective north pole $N_e$ of the D. C. motor shifts one quarter turn clockwise; while if P is 1, flip-flops A1 and B1 must be so changed that the effective north pole $N_e$ shifts one quarter turn counter-clockwise.

Referring to Figure 6, it is noted that in the 1st row of the table both A1 and B1 are zero. For such a setting of the flip-flops the effective north pole is in quadrant IV of the motor in Figure 3. P is likewise zero which defines clockwise rotation. Thus, in order to shift this effective north pole clockwise into quadrant III on occurrence of the next clock pulse C, A1 must be placed in a one condition, i. e., the polarity across horizontal poles A must be reversed; while B1 remains the same, i. e., the polarity of the vertical poles B is maintained. Thus A1 is made a 1 and B1 remains 0 in the "change required" columns 36 of the table in Figure 6. Switch trigger propositions $a$ and $b$ for flip-flops A1 and B1, respectively, are represented by a 1 in the table when they are to change their respective flip-flops and by a 0 when no change is required. Hence $a$ is indicated by a 1 and $b$ is indicated by a 0 in the 1st row.

Referring to the 5th row of the table, it is noted that flip-flops A1 and B1 are again both zero so that the effective north pole is again in quadrant IV of the motor. However, P is equal to 1, for this case, which defines counter-clockwise rotation. Thus, in order to shift the effective north pole counter-clockwise into quadrant I on occurrence of the next clock pulse, A1 remains the same but B1 must change to a one condition. Since flip-flop B1 must be triggered to effect this change, a 1 is placed in the $b$ column and a 0 is placed in the $a$ column of the 5th row in the table.

Using this same system of thought, each of the other combinations of input propositions is analyzed and the remaining rows of the table filled.

Using the states of the four input propositions in the table, the equations for the input switch propositions $a$ and $b$ can now be written using symbolic logic notation. Switch proposition $a$ is true (as indicated by 1 in its respective column) for four possible combinations of states of the inputs.

Thus:

$$a = CP'A_1'B_1' + CP'A_1B_1 + CPA_1'B_1 + CPA_1B_1'$$

simplifying $$a = [P'(A_1'B_1' + A_1B_1) + P(A_1'B_1 + A_1B_1')]C$$

In a similar manner:

$$b = CP'A_1'B_1 + CP'A_1B_1' + CPA_1'B_1' + CPA_1B_1$$

simplifying $$b = [P'(A_1'B_1 + A_1B_1') + P(A_1'B_1' + A_1B_1)]C$$

Referring to Figure 7, the logical network for physically solving the switch Equations a and b is shown and will next be described.

Two basic circuits are needed to solve these equations: a logical multiplication circuit known also as an "and" circuit; and a logical addition circuit known also as an inclusive "or" circuit.

In Figure 7, the first parenthetic portion of the Equation a, $(A_1'B_1'+A_1B_1)$, which is also the second parenthetic portion of the Equation b, is obtained by multiplying terms $A_1'$ and $B_1'$ in a typical logical multiplication circuit 49. This is accomplished by applying the potentials on the left outputs of flip-flops A1 and B1 on input diodes 41 and 42, respectively. The plates of diodes 41 and 42 are connected to a junction 43. Junction 43 is connected to a positive potential source E+ through a resistor $R_5$. Whenever terms $A_1'$ and $B_1'$ are true their potentials are relatively high, and current which normally would flow through resistor $R_5$ is cut off; thus solution line 45 connected to junction 43 becomes relatively high in potential. In a similar manner, terms $A_1$ and $B_1$ are multiplied in a product circuit 46 whose output is sensed on solution line 47. Lines 45 and 47 are then fed into a typical logical addition circuit 49. This circuit has the cathodes of its input diodes 50 and 51 connected to a common junction 52 returned to ground through a resistor $R_7$. Whenever either one, or both, of the lines 45 or 47 is relatively high in potential, current flowing through resistor $R_7$ raises addition output line 54 to a relatively high potential indicative of the logical sum $(A_1'B_1'+A_1B_1)$.

In a similar manner the second parenthetic portion of Equation a $(A_1'B_1+A_1B_1')$, which is also the first parenthetic portion of Equation b, is generated and represented by a high potential on line 57.

In order to obtain the solution to Equation b, the output on line 54 is cascaded toward the left into a third multiplier 56 where it is combined with term P fed in on channel P from computer 1. The output on line 57, on the other hand, must be multiplied by the state of channel proposition P represented by term P'. This latter term is obtained by reversing the level of potential of channel P in an inverter tube 58. Thus the solution on line 57 is combined with term P' in multiplying circuit 59. The output of this latter multiplying circuit 59 is then combined with the output from third multiplier 56 in a second addition circuit 60. Finally the output of circuit 60 is combined with the clock pulse C in final product circuit 61. When both the inputs to circuit 61 are relatively high in potential a positive pulse is fed into the common triggering point of flip-flop B1 thus changing its state and consequently the setting of switch $S_2$.

The solution of Equation a is similarly obtained by first multiplying the output on line 54 and line 57 with terms P' and P, respectively, adding the products so obtained, and then multiplying the result by a clock pulse C. Whenever the potential representing a is relatively high, flip-flop A1 is triggered to its opposite state and consequently switch $S_1$ is reversed.

It should be understood that in operation of the above described logical circuit, the spacing of the clock pulses on the C channel is such that, after triggering, the flip-flops have a chance to settle to their new states before the successive clock pulse arrives on channel C.

While the mechanism and circuits as herein shown and described are admirably adapted to fulfill the features of the present invention as previously stated, it is to be expressly understood that the invention is not to be limited to the arrangement of the preferred embodiment disclosed, for the invention is susceptible of embodiment in various forms all coming within the legitimate and valid scope of the appended claims.

What is claimed is:

1. A digital control system comprising a motor having an armature and four field poles, coils wound on each of said poles, a first circuit connecting one set of opposite pole coils, a second circuit connecting the other set of opposite pole coils, a power supply, a first reversing switch connecting the terminals of said first circuit to said power supply, a second reversing switch connecting the terminals of said second circuit to said power supply, a first and second switch actuating means for operating said first and second reversing switches, respectively, a first flip-flop circuit controlling the energization of said first switch actuating means, a second flip-flop circuit controlling the energization of said second switch actuating means, a source of electronic pulses, and a logical circuit for triggering said flip-flops in accordance with pulses from said source and the states of said flip-flops.

2. A control system which includes: a motor having a rotor and sets of poles arranged therearound, said rotor being capable of incremental rotation in either direction; means for supplying power to said sets of poles; relay means connecting each set of poles to said supply means to energize said poles, said relay means being selectively operable to reverse the connection to said poles for energizing them in opposite directions; and a control circuit connected to said relay means and to a source of electronic information, said information source having a first channel providing signals representing incremental rotations of said rotor, and having a second channel providing signals representing the direction of each said incremental rotations, said control circuit having means response to the condition of each of said relay means, other means responsive to said first channel signals, and still other means responsive to said second channel signals, said control circuit connecting all of said responsive means together so that upon establishment of a given coincidence of signals, a predetermined relay means is operated to cause said motor to rotate its rotor an incremental rotational amount in the direction called for by said second channel signal, regardless of the previous position of said rotor.

3. A digital control system comprising a motor having an armature and a plurality of field poles; coils wound on each of said poles; circuit means for connecting sets of opposite pole coils; means for supplying power for energizing said coils; reversing switches for connecting the terminals of each of said circuit means across said supply means; switch actuating means for operating each of said reversing switches; flip-flop circuits having an on and off condition for controlling the energization of each switch actuating means when in an on condition; a source of electronic information; and a control circuit responsive to both the on and off conditions of said flip-flop circuits and the information from said source for triggering said flip-flop circuits to produce incremental rotations of said armature.

4. A control system which includes: a motor having a rotor and sets of poles arranged therearound; means for supplying power to said sets of poles; relay means connecting each set of poles to said supply means to energize said poles, said relay means being selectively operable to reverse the connection to said poles for energizing them in opposite directions; and a control circuit connected to said relay means and to a source of electronic information providing signals representing incremental rotations of said rotor, said control circuit having means responsive to the condition of each of said relay means, and other means responsive to said information signals, said control circuit connecting said responsive means together so that upon establishment of given coincidences of signals, predetermined relay means operate to cause said motor to rotate its rotor an incremental rotational amount, regardless of the previous position of said rotor.

5. A digital control system comprising a motor having an armature and a plurality of field poles; coils wound on each of said poles; circuit means for connecting opposite pole coils; means for supplying power for energizing said circuit means so that opposite poles will be of opposite polarity; relay means connecting each of said circuit means to said supply means to reverse the connection to said poles so as to reverse their polarities; a pair of flip-flop circuits each having a pair of outputs and a single trigger input, each of said relay means operated in accordance with the condition of one of said flip-flop circuits; a source of electronic information providing signals on two channels; and a logical circuit responsive to the outputs of said flip-flop circuits and the signals on said channels, said logical circuit being so arranged and constructed that a coincidence of signals on said channels triggers said flip-flop circuits to cause the armature of said motor to be incrementally rotated in one direction, and a lack of coincidence of signals on said channels triggers said flip-flop circuits to cause the armature of said motor to be incrementally rotated in the opposite direction.

6. A digital control system comprising a D. C. motor having a rotor and four field poles equally spaced therearound; coils wound about each of said poles; a first circuit connecting one set of opposite pole coils in series; a second circuit connecting the other set of opposite pole coils in series; means for supplying power for energizing said coils; a first reversing switch connecting the terminals of said first circuit across said supply means; a second reversing switch connecting the terminals of said second circuit across said supply means, the coils in each of said series circuits being wound so that opposite poles have opposite polarity when energized by said power supply; a first switching means controlling the setting of said first reversing switch; a second switching means controlling the setting of said second reversing switch; a source of electronic information including a first channel providing information representing fixed incremental rotations of said rotor and a second channel providing information representing the direction of each said incremental rotations; and a logical diode matrix for triggering said switching means in accordance with the information on said channels and the previous settings of said reversing switches, whereby said rotor is capable of being rotated a fixed incremental amount in the direction called for by said second channel, irrespective of the previous position of said rotor.

7. In combination, a pair of two-position switches, said switches having four possible combinations of settings; a pair of electromagnetic means each controlling the setting of one of said switches; a pair of flip-flop circuits each having an on and off condition and connected to one of said electromagnetic means for energizing the same when in an on condition; a source of electronic pulses; and a control circuit responsive to both the on and off conditions of said flip-flop circuits and said pulses so that upon establishment of given coincidences of signals a predetermined flip-flop circuit is triggered so as to change the settings of said switches in an orderly sequence.

8. In combination, a plurality of reversing switches whose settings are to be controlled; electromagnetic means operably connected to each of said reversing switches; flip-flop circuits for controlling the energization of each of said electromagnetic means, each of said flip-flop circuits having a pair of outputs and adapted to be triggered by a pulse fed in on a single input; a first and second signal input channel; an inverter for the signal on said first input channel; circuit means combining signals on the outputs of said flip-flop circuits with the signals on said first input channel and the inverted signals of said first input channel for generating a plurality of control signals; and means responsive to said control signals for gating signals on the second channel into the input of one of said flip-flop circuits at a time for causing the settings of said reversing switches to change in an orderly manner.

9. In combination, a plurality of two-position switches having combinations of settings through which the switches are selectively actuated in either direction within a predetermined sequence; switching means operably connected to each of said switches for changing the settings thereof; a plurality of flip-flop circuits each having a pair of outputs providing signals indicative of the state of the flip-flop, each of said switching means being connected to a corresponding flip-flop circuit and energized by the signals on one of the outputs of said flip-flop circuit; a source of electronic information having a first channel providing signals indicating that the setting of the switches is to be changed, and having a second channel providing signals representing the direction within said sequence that the switch settings should be changed; a control circuit having means responsive to the signals on the output of said flip-flop circuits; other means responsive to said first channel signals; and still other means responsive to said second channel signals, said control circuit connecting all of said responsive means together so that upon establishment of a given coincidence of signals, a predetermined flip-flop circuit is triggered to cause said switches to change their setting in the direction of the sequence called for by said second channel signal, irrespective of the previous settings of said switches.

10. Apparatus in accordance with claim 9 wherein the responsive means of said control circuit are connected together to form logical multiplication and logical addition circuits.

11. In combination, a first and second flip-flop circuit whose combined settings are to be sequentially controlled, said flip-flop circuits each having a pair of outputs with relatively high and low potential signals thereon indicative of their state, said flip-flop circuits each being adapted to be triggered from one state to the other by a pulse fed therein on a single input; first and second input channels for providing relatively high and low potential signals; and circuit means for combining the potentials on the outputs of said flip-flop circuits with the potential on said second input channel, said circuit means being operable so that when said flip-flop circuits are in the same state, a high potential signal on said second channel causes a high potential signal on said first channel to be sent to the input of said first flip-flop circuit, and a low potential signal on said second channel causes a high potential signal on said first channel to be sent to the input of said second flip-flop circuit, and when said flip-flop circuits are in opposite states, a high potential signal on said second channel causes a high potential signal on said first channel to be sent to the input of said second flip-flop circuit, and a low potential signal on said second channel causes a high potential signal on said first channel to be sent to the input of said first flip-flop circuit.

References Cited in the file of this patent

UNITED STATES PATENTS

| | | |
|---|---|---|
| 2,402,928 | Summers | June 25, 1946 |
| 2,465,624 | Agins | Mar. 29, 1949 |
| 2,489,824 | Shenk | Nov. 29, 1949 |
| 2,519,667 | Koenig | Aug. 22, 1950 |
| 2,537,427 | Seid et al. | Jan. 9, 1951 |
| 2,538,789 | Maynard | Jan. 23, 1951 |
| 2,552,137 | Bivens | May 8, 1951 |
| 2,557,086 | Fisk et al. | June 19, 1951 |
| 2,570,716 | Rochester | Oct. 9, 1951 |
| 2,610,317 | Fowler | Sept. 9, 1952 |